United States Patent

[11] 3,542,195

| [72] | Inventor | Alfonse J. Soriente<br>Gillette, New Jersey |
|---|---|---|
| [21] | Appl. No. | 756,480 |
| [22] | Filed | Aug. 30, 1968 |
| [45] | Patented | Nov. 24, 1970 |
| [73] | Assignee | Union Tank Car Company<br>Chicago, Illinois<br>a corporation of Delaware |

[54] FILTER CARTRIDGE
8 Claims, 5 Drawing Figs.

[52] U.S. Cl. .................................................. 210/108,
210/121, 210/333, 210/341, 210/489
[51] Int. Cl. .................................................... B01d 27/12
[50] Field of Search .................................... 210/108,
100, 121, 122, 123, 332—334, 340, 341, 489

[56] References Cited
UNITED STATES PATENTS

| 2,533,395 | 12/1950 | Paine | 210/123X |
| 2,556,872 | 6/1951 | Deters | 210/123X |
| 3,250,703 | 5/1966 | Levendusky | 210/193X |
| 3,373,104 | 3/1968 | Ryan | 210/333X |
| 3,445,002 | 5/1969 | Muller | 210/108 |

Primary Examiner—John W. Adee
Attorneys—Hume, Clement, Hume & Lee and Charles M. Kaplan ABSTRACT: An improved filter apparatus incorporating cartridges to be coated with a precoat layer of filter medium, including means for cleaning the filters by introducing air and liquid to the interior thereof, gradually filling the surrounding tank. The improvement of the invention comprises the use of a float within the interior of the filter cartridges to equalize air pressure within each individual cartridge as well as among several cartridges.

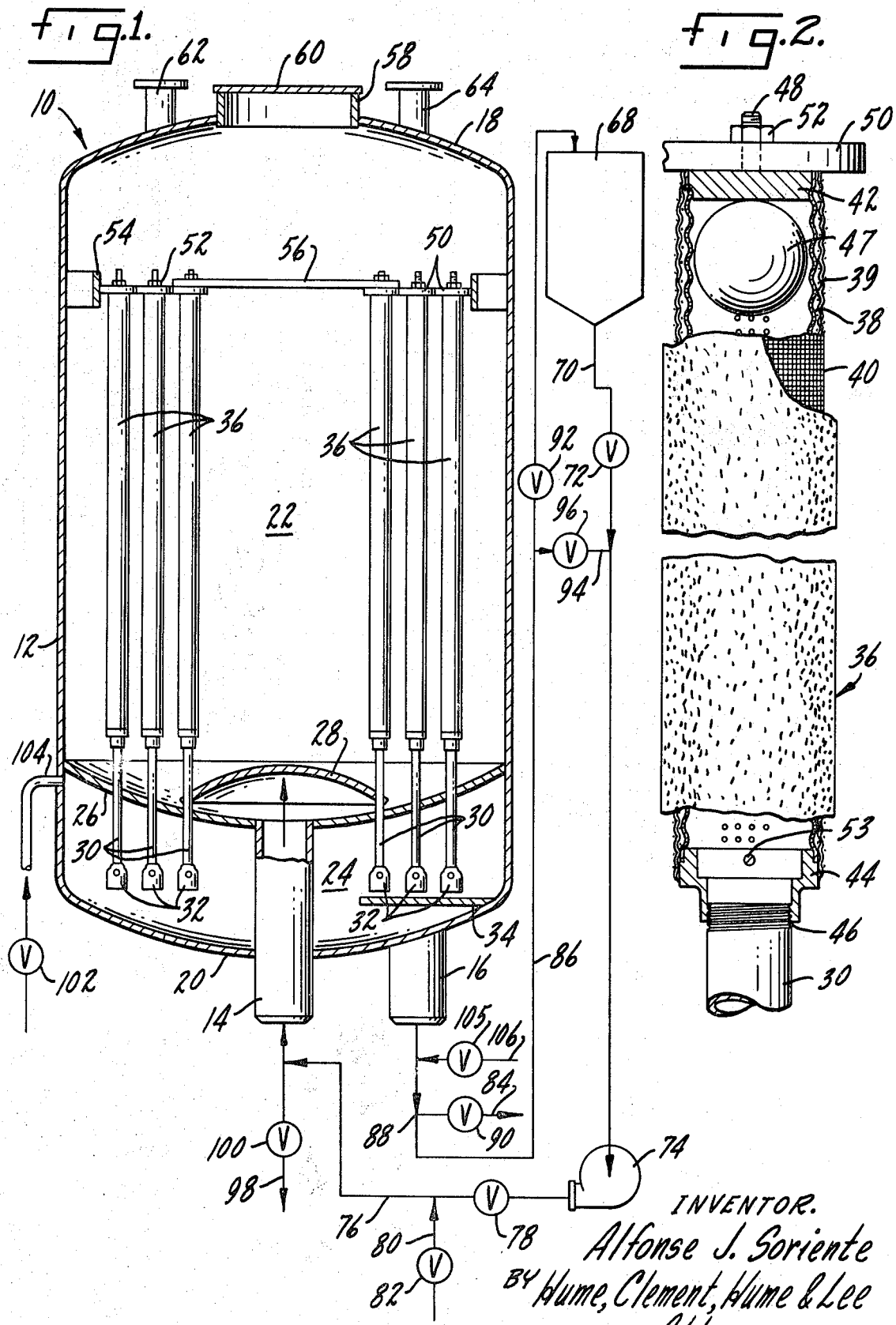

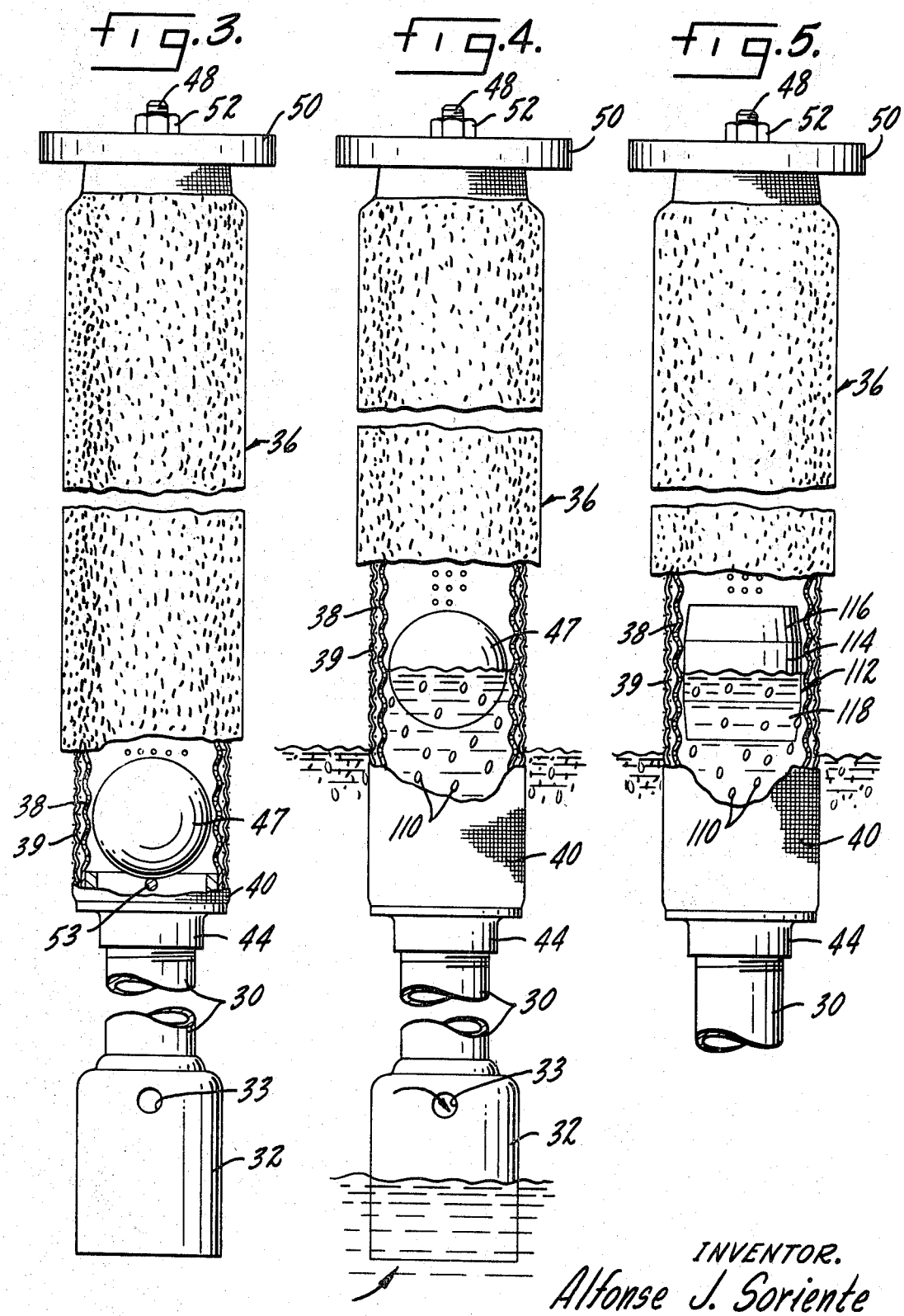

FILTER CARTRIDGE

The present invention invention relates to an improved filter cartridge, and more specifically to an improved filter cartridge which facilitates the uniform removal of a precoat layer during the cleaning procedure.

It has been discovered that improved removal of impurities from a fluid may be obtained by passing the fluid through a filter comprising a filter screen precoated with a layer of ion exchange resin particles in the size range of about 60 to 400 mesh, hereinafter referred to sometimes as "finely divided" resin particles. Such a method has become well known in the art, and is disclosed and claimed in U.S. Pat. No. 3,250,703, issued May 10, 1966, and assigned to the assignee of this application.

Periodically, the finely divided resin particles become exhausted, and it is necessary to clean the filter in order to remove the resin particles so that they can be replaced with another layer of fresh particles, referred to herein as a "precoat" layer. The filters normally employed are annular in shape and made of perforated metal or the like covered with one or more layers of screen. These filters are vertically positioned within a tank. A particularly successful method for cleaning these filters includes the introduction of a mixture of a gas and a liquid into a lower portion of the filter through the filter in reverse flow to its normal operation. As the liquid flows out of the filter and into the surrounding tank, the filter is gradually submerged. This forms a gradually rising area of agitated bubbling liquid and gas which cleans the filter through the combined action of agitation and collapsing air bubbles. The collapsing air bubbles exert a pulling force, tending to remove particles from the filter surface. The liquid then carries away and dilutes the filter cake and precoat layer removed from the filter surface. After the surrounding tank has been filled at least to the top of the cartridges, it is drained while delivery of gas to the cartridge interior is continued. The aforementioned process is repeated until the cartridges are clean.

While this method has been found quite successful, in certain instances difficulty is encountered in the nonuniform cleaning of a filter. This can occur when the gas pressure within the filter causes removal of precoat layer and filter cake above the liquid-gas interface, which causes the gas being introduced into the filter to rush to that point and decreases the pressure, and thus the cleaning efficiency, over the remainder of the filter. This problem is particularly acute in filter tanks employing a plurality filter cartridges, as is normally the case. The removal of excessive precoat layer and filter cake from one particular filter cartridge causes the gas to rush to that cartridge, and the remaining cartridges receive relatively little gas.

The present invention provides an improved filter cartridge adapted for vertical mounting in a filter tank which aids in overcoming the aforementioned problem of nonuniform cleaning. Generally, the invention comprises an annular filter cartridge body having a generally cylindrical interior together with means for mounting the cartridge in a filter tank. Within the cartridge, a float is positioned for axial movement in close spaced relationship with the interior walls. The float has an overall density which permits it to rise when the cartridge is filled with the liquid being filtered as well as the liquid used for cleaning. However, when the cartridge is emptied of liquid it drops to a lower portion of the interior. During the cleaning step, this float tends to prevent separation of gas and liquid within the filter, which can result in excessive cleaning above the level of the liquid in the surrounding tank. When a plurality of filters are involved, the float tends to equalize the gas pressure among the cartridges.

The invention, both as to its organization and method of operation, taken with the objects and advantages thereof, will be best understood by reference to the following detailed description taken in conjunction with the drawings, in which:

FIG. 1 is a cross-sectional view of a filter tank and cartridge assembly of the type employed in the present invention together with a schematic representation of a filtering system designed for use with the filter tank;

FIG. 2 is a side elevation view of a filter cartridge in accordance with the present invention during normal filtering operation, partially cut away to show the interior details thereof;

FIG. 3 is a partially cut away side elevation view of the filter cartridge of FIG. 2 after the tank has been emptied, also illustrating the cartridge seat means and gas distributor;

FIG. 4 is a partially cut away side elevation view of the filter cartridge, cartridge seat means, and gas distributor shown in FIG. 3 as they would appear during the cleaning procedure; and FIG. 5 is a partially cut away side elevation view of a second filter cartridge in accordance with the present invention as it would appear during the cleaning procedure.

Referring to FIG. 1, the filter apparatus of the present invention is generally indicated by reference numeral 10. The apparatus 10 includes a filter tank 12 having an inlet line 14 and an outlet line 16. The filter tank 12 is a generally cylindrical vessel made of steel or the like and having an outwardly convex top 18 and an outwardly convex bottom 20. The tank 12 is divided into an influent zone 22 and a filtrate zone 24 by a downwardly convex tube sheet plate 26, suitably secured to the interior of the tank 12 by welding or the like. The inlet line 14 extends through the bottom 20 of the tank and communicates with the influent zone 22 so that all of the influent liquid is passed directly to the influent zone 22. The inlet pipe 14 is attached to the tube sheet plate 26 by welding or the like. In this manner, direct communication between the influent zone 22 and the filtrate zone 24 is precluded. An upwardly convex distributor plate 28 is secured to the tube sheet plate 26 above the inlet line 14. This distributor plate 28 distributes liquid entering through the inlet line 14 radially outwardly into the influent zone 22.

A plurality of filter cartridge seat means 30 extend through holes in the tube sheet plate 26, and are attached thereto by welding or other suitable means. The filter cartridge seat means 30 are substantially parallel to the longitudinal axis of the filter tank 12, and provide communication between the influent zone 22 and the filtrate zone 24. The filter cartridge seat means 30 preferably have their upper ends threaded to receive filter cartridges, and include gas distributors 32 on the lower ends thereof. These gas distributors 32 are generally annular in shape, are open at the bottom, and communicate with the cartridge seat means 30. As shown in more detail in FIG. 3, the gas distributors 32 each have a gas inlet port 33 and an upper portion of the side. As hereinafter described, the gas distributors 32 help ensure an even distribution of a gas-liquid mixture to the filter cartridges during the cleaning procedure.

Referring again to FIG. 1, a backwash baffle 34 is positioned opposite the outlet line 16 in the filtrate zone 24 to provide for even distribution of liquid during the cleaning step, as hereinafter described.

Mounted within the influent zone 22 are a plurality of filter cartridges or elements 36 through which the influent stream must pass before entering the filtrate zone 24 and being discharged from the filter tank 12 through the outlet line 16. The filter cartridges 36 are annular in shape. As shown in FIG. 2, the filter cartridges 36 each include a corrugated, perforated body portion 38 of suitable corrosion-resistant material such as aluminum or stainless steel. The body portion 38 is covered with a layer of coarse screen 39, which, in turn, is wrapped with a fine screen 40 as is well known in the art. Suitable coarse screen 39 is 8 to 10 mesh, while a suitable fine screen 40 is 50 × 250 mesh. The filter cartridges 36 have a generally cylindrical interior, and include a closed top cap assembly 42 and lower mounting means 44, both of which are secured to the cartridge 36. The body portion 38 and the screens 39, 40 are preferably welded to the top cap assembly 42 and to the lower mounting means 44 so that access to the interior of the cartridge 36 is prohibited except through the screens 39, 40 or through the lower mounting means 44. The lower mounting means 44 include a threaded portion 46 which screws on to the threaded portion of the filter cartridge seat means 30. It will be understood that various other means may be used to mount the filter cartridges 36 within the tank 12, as is well known to those skilled in the art. The top cap assembly 42 includes a central upwardly extending bolt 48 to which a spacer means 50 and nut 52 are secured. The screens 39, 40, top cap assembly 42, and lower mounting means 44 are all preferably made of corrosion-resistant metal such as aluminum or stainless steel.

Within the interior of each filter cartridge 36 is located a spherical float 47, which is free to move axially through the interior of the cartridge 36 in close spaced relationship with the walls thereof. As explained hereinafter in more detail, the overall density of the float 47 is below the density of the liquid being filtered and of the liquid used for cleaning the filters. By the term "overall density," it will be understood that the float 47 as a whole must be capable of floating on the liquid being filtered and on the cleaning liquid, although the float 47 may have local areas of higher density as, for example, a weighted bottom portion. Thus, as shown in FIG. 2, the float 47 will be at the top of the cartridge interior during normal operation, when the cartridge is filled with liquid. A transverse rod 53 is preferably mounted in the lower mounting means 44 to prevent the float 47 from seating itself in the lower mounting means 44 when the cartridge 36 is emptied, as illustrated in FIG. 3. The float 47 is preferably made of a corrosion-resistant metal or plastic.

Referring again to FIG. 1, it will be seen that a plurality of filter cartridges 36 are suitably spaced within the tank 12 by the spacer means 50, and are also suitably spaced from the side walls of the tank 12 by an annular ridge member 54. To further stabilize the filter cartridges 36 within the tank 12, the innermost cartridges 36 are secured to adjacent or other cartridges by a plurality of retaining bars 56. The use of such retaining bars 56 is well known to those skilled in the art, and is shown in more detailed in U.S. Pat. No. 3,279,608, issued on Oct. 18, 1966, and assigned to the assignee of the present application.

The filter cartridges 36 are placed into and removed from the filter tank 12 through a small manhole opening 58 in the top 18 of the filter tank 12. The manhole opening 58 has a cover 60 which may be removed or opened as desired, to provide access to the interior of the tank 12.

The filter tank 12 is also provided with a vent 62 and a spare inlet pipe 64, which in this instance is capped. The vent 62 may be of any suitable construction, as is within the ordinary skill of the art.

Because the filter apparatus 10 will normally be used to treat a stream of water, while a mixture of water and air are employed during the cleaning procedure, the following description is in terms of these substances. As those skilled in the art will understand, however, the filter apparatus 10 may be used to treat other liquids. Similarly, other gases such as nitrogen, helium, and oxygen, and other liquids such as organic solvents, detergent solutions, etc., could be used during the cleaning procedure.

A water slurry of a suitable precoat medium, in this instance finely divided ion exchange resin particles in the size range of 60 to 400 mesh, is stored in a precoat tank 68. A slurry line 70 controlled by a slurry valve 72 connects the precoat tank 68 with a slurry pump 74. A transfer line 76 connects the pump 74 with the inlet line 14 of the filter tank 12. A transfer valve 78 adjacent to the pump 74 and in the transfer line 76 controls the passage of slurry or liquid from the pump 74.

The water to be treated enters the filter system through a feed line 80 having an intake control valve 82. The feed line 80 is connected to the transfer line 76 between the transfer valve 78 and the inlet line 14.

The outlet line 16 from the filter tank 12 is connected to a service line 84 and a precoat return line 86 at a T-juncture 88. The service line 84 is connected to service units (not shown) such as a steam generator or the like, and has a service valve 90. The precoat return line 86 is connected to the precoat tank 68 and has a return valve 92 to control the flow of slurry back to the precoat tank 68.

A bridge line 94 with a bridge valve 96 interconnects the precoat return line 86 and the slurry line 70. A drain line 98 with a valve 100 communicates with the inlet line 14.

In operation, during the precoating step, a precoat layer of finely divided ion exchange resin particles is deposited upon the upstream sides of the filter cartridges 36, *i.e.*, the side where the water is introduced into the filter cartridges 36 during normal operation. Similarly, during the filtering step a filter cake builds up within and on the upstream side of the precoat layer.

In preparing the filter system 10 for operation, the initial step is to precoat the filter cartridges 36. In order to accomplish this, the filter tank 12 filled with low-impurity water, such as demineralized water. A slurry of precoat medium and demineralized water is prepared in the precoat tank 68, the precoat medium being finely divided ion exchange resin particles.

During the precoating step, all valves are closed except the slurry valve 72, the transfer valve 78, and the return valve 92. The precoating step is initiated by starting the pump 74, thereby drawing the resin precoat slurry from the precoat tank 68 and through the slurry line 70 to the pump 74. The slurry is forced by the pump 74 through the transfer line 76 and the inlet line 14 into the filter tank 12. The pressure of the incoming slurry forces the demineralized water in the filter tank 12 through the filter cartridges 36 and out of the filter tank 12 via the filtrate zone 24 and the outlet line 16. This demineralized water enters the precoat tank 68 through the return line 86.

As the cycling continues, the precoat slurry is brought into contact with the upstream surfaces of the filter cartridges 36. The finely divided resin particles of the precoat medium are separated from the slurry and deposited as a precoat layer upon the surfaces of the filter cartridges 36. The slurry is circulated through the filter system in this manner until a sufficient depth of resin precoat layer is deposited. The precoating step is terminated by closing the slurry valve 72 and the return valve 92 and opening the bridge valve 96. The pump 74 is kept running until the recycle stream is clear. Then the filter system is ready to be used to treat the feed water. The thickness of the precoat layer may be greater than a few inches, but it is preferred that the layer have a thickness in the range of about 1/16 to 2 inches, and more preferably about 1/8 to 1 inch, and most preferably 1/8 to 5/8 inch.

The service run is begun by closing the bridge valve 96 and the transfer valve 78 and opening the service valve 90 and the intake valve 82. In this manner, untreated water enters the filter system through the feed line 80 and passes through the transfer line 76 and the inlet line 14 to the filter tank 12. The pressure of the incoming untreated water forces it through the resin precoat layer, the filter cartridges 36, and the filtrate zone 24 into the outlet line 16. During this period, the internal floats 47 remain at the tops of the filter cartridges 36 as shown in FIG. 2. Each float 47 will remain in this position as long as the filter cartridge 36 is filled with liquid, since it has a density below that of the liquid.

As the untreated water passes through the precoat layer, an ion exchange reaction takes place to remove dissolved impurities from the water. In addition, undissolved impurities are removed from the untreated water by virtue of the water passing through the filter cartridges 36 and the precoat layer of finely divided ion exchange resin particles. The filter cake, consisting of undissolved impurities, builds up within and on the precoat layer as the process continues. The purified or treated water flows through the filtrate zone 24 and the outlet line 16 to the service line 84 for use.

Eventually the resins will become exhausted and must be regenerated or discarded. At this time the filtering or service cycle is stopped by closing the intake valve 82 and the service valve 90. To clean the filter tank, the vent 62 and the drain valve 100 are opened and the filter tank 12 is drained. The drained valve 100 is closed after draining is completed. As the tank 12 is drained, the liquid will be removed from the filter cartridges 36, and the float 47 will gradually settle to the bottom of the filter cartridge 36, to contact the rod 53, as illustrated in FIG. 3. At this stage the precoat layer will remain on the filter cartridges 36.

A mixture of air and water is then passed into the interior of the filter cartridges 36 at their lower ends in order to clean them. To accomplish this, air is introduced into the filtrate zone 24 by opening an air valve 102 on an air line 104 communicating through the side wall of the tank 12 with an upper portion of the filtrate zone 24. Simultaneously, water is admitted to the filtrate zone 24 by opening a valve 105 in a cleansing water inlet line 106 communicating with the outlet line 16. The incoming water will rise to a level corresponding approximately to the midpoint of the gas distributors 32, whereupon the pressure head produced by the introduction of air into the filtrate zone 24 will prevent the liquid from rising further. Instead, the liquid will pass through the bottoms of the gas distributors 32 and up through the seat means 30 to the interior of the filter cartridges 36. The approximate water level at this point is shown in FIG. 4. At the same time air which has been fed into the filtrate zone through the air line 104 passes through the gas metering ports 33 where it is mixed with water and passes up into the interior of the filter cartridge 36 forming air bubbles 110. The flow rate of air is preferably in the range of about 1 to 1.5 cubic feet per minute per square foot of filter surface area. The water or other cleansing liquid is added at a sufficient rate to cause it to rise in the influent zone 22 at about 3 to 15 inches per minute.

As the air-water mixture enters the interior of the filter cartridges 36, finely divided resin particles, together with the remaining constituents of the filter cake, are removed by the combined effect of agitated liquid and collapsing air bubbles as the air-water mixture passes out through the walls of the filter cartridges 36. As the input of air and water continues, the water flowing out into the surrounding influent zone 22 forms a rising area of agitated, bubbling liquid and gas which gradually cleans the filter from the bottom to the top. As the level of liquid rises, the float 47 also rises. Because of the presence of the float 47 within the filter cartridges 36, the excessive removal of filter cake and precoat is prevented at portions of the filter cartridges 36 above the level of the rising liquid, so that the filter cartridges 36 are all uniformly cleaned. That is, air or an air-water mixture will not be caused to rush to a particular filter cartridge 36, or to a particular area of an individual cartridge 36, because of a premature removal of filter cake and precoat in that area.

It is important that the float 47 be in close spaced relationship with the interior walls of the filter cartridge 36, in order to minimize the escape of air to portions of the cartridge 36 above the float 47. Since the cartridge 36 has a generally cylindrical interior, it is simply necessary that the float 47 be of the proper size to be close to the walls and yet move freely along the axis of the filter cartridge 36.

After the influent zone 22 has filled with water to at least the level corresponding to the tops of the filter cartridges 36, the delivery of liquid to the bottoms of the cartridges 36 is halted by closing the valve 105 in the cleansing water inlet line 106. The valve 100 in the drain line 108 is then opened, and the water level within the influent zone 22 begins to fall. The delivery of air through the air line 104 is continued, so that a gradually falling liquid-gas interface is formed in the tank 12, while bubbling, agitation, and further cleaning takes place along the cartridges. During this step, the float 47 also falls along with the water in the influent zone 22, again preventing the distribution of excessive air to any particular cartridge, since the distribution of air to areas above the level of the float 47 is retarded. During this draining procedure, finely divided resin particles and filter cake which have been removed from the filter cartridges 36 are carried away. Optimum results are achieved if the valve 100 is adjusted so that the water level in the influent zone 22 falls at a rate of about 4 to 6 inches per minute.

After the influent zone 22 has been drained, the valve 100 in the drain line 98 is closed, and the aforementioned cleaning procedure is repeated a sufficient number of times to thoroughly clean the filter cartridges 36. During the second and later cleaning steps, the influent zone 22 may be filled at a greater rate than during the first step, since a large portion of the resin particles and filter cake will have been removed during this first cleaning step.

After the filter cartridges 36 have been thoroughly cleaned, the tank 12 is drained for the last time and the air supply is terminated by closing the air valve 102. The service cycle may then be repeated after the filter cartridges 36 have been precoated in the manner previously described.

Referring to FIG. 5, a modified float 112 is shown in the same position as the spherical float 47 of FIG. 4. The modified float 112 has a central, generally cylindrical portion 114, thus providing a close spaced relationship along a greater length of the interior of the filter cartridge 36. The modified float 112 thus produces a better seal, and is less likely to permit significant quantities of gas to escape past its side walls. In order to prevent the modified float 112 from becoming jammed within the interior of the filter cartridge 36, it has a frustoconical top section 116 and a frustoconical bottom section 118.

Typical solid cation exchange resin particles which may be employed in the filtering apparatus discussed herein are the divinylbenzene-styrene copolymer type, the acrylic type, the sulfonated coal type, and the phenolic type. These may be used in the sodium, hydrogen, ammonium, or hydrazine form, for example. Typical solid anionic exchange particles that may be employed are the phenol-formaldehyde type, the divinylbenzene-styrene copolymer type, the acrylic type, and the epoxy type. The anionic resin particles may be used in the hydroxide or chloride form, for example. Often a mixture of anionic and cationic resin will be employed.

Though the apparatus of the present invention has been discussed in connection with a precoat layer of finely divided ion exchange resin particles, it may likewise be used where the precoat layer is of another filter material such as diatomaceous earth, or any other precoat materials, as will be understood by those skilled in the art.

Obviously, many modifications and variations of the present invention as hereinbefore set forth will occur to those skilled in the art, and it is intended to cover in the appended claims all such modifications and variations as fall within the true spirit and scope of the invention.

I claim:

1. An improved filter cartridge adapted for vertical mounting in a filter tank comprising: an annular cartridge body having a generally cylindrical interior; a closed top cap assembly at one end of said cartridge; means for mounting said cartridge in said filter tank; a float positioned within said interior for axial movement in close spaced relationship with the walls thereof, said float having an overall density permitting it to rise when said cartridge is filled with the liquid being filtered and when filled with cleaning liquid; and means to prevent seating of said float at the end of said cartridge opposite said top cap assembly.

2. The filter cartridge as defined in claim 1 wherein said float is spherical.

3. The filter cartridge as defined in claim 1 wherein said float includes a generally cylindrical portion having side walls parallel to the interior walls of said cartridge.

4. A improved apparatus for the filtration of liquid comprising: a filter tank; plate means separating said tank into an upper influent zone and a lower filtrate zone; an annular cartridge seat means supported on said plate means and providing communication between said influent and filtrate zones; an annular filter cartridge having a generally cylindrical interior and mounted on said seat means in a substantially vertical position in said influent zone; and a float positioned within said interior for axial movement in close spaced relationship with the walls thereof, said float having an overall density permitting it to rise when said cartridge is filled with the liquid being filtered and when filled with cleaning liquid.

5. The filter apparatus as defined in claim 4 further including means for simultaneously supplying a cleaning liquid and gas under pressure to the interior of said cartridge.

6. An improved apparatus for the filtration of liquid comprising: a filter tank; plate means separating said tank into an upper influent zone and a lower filtrate zone; a plurality of annular filter cartridge seat means supported on said plate means and providing communication between said influent and filtrate zones; a plurality of annular filter cartridges each having a generally cylindrical interior, said cartridges mounted on said seat means in a substantially vertical position in said influent zone; means for simultaneously supplying gas under pressure and cleaning liquid to the interior of said cartridge through said seat means; and a float positioned within the interior of each of said cartridges for axial movement in close spaced relationship with the walls thereof, said float having an overall density permitting it to rise when said cartridge is filled with the liquid being filtered and when filled with said cleaning liquid.

7. The apparatus as defined in claim 6 wherein said float is spherical.

8. The apparatus as defined in claim 6 wherein said float includes a generally cylindrical portion having side walls parallel to the interior walls of said cartridges.